Oct. 13, 1931.    C. W. KELLEY    1,827,239
PRESSURE OPERATED DEVICE FOR LEADING WIRES THROUGH CONDUITS
Filed July 26, 1928
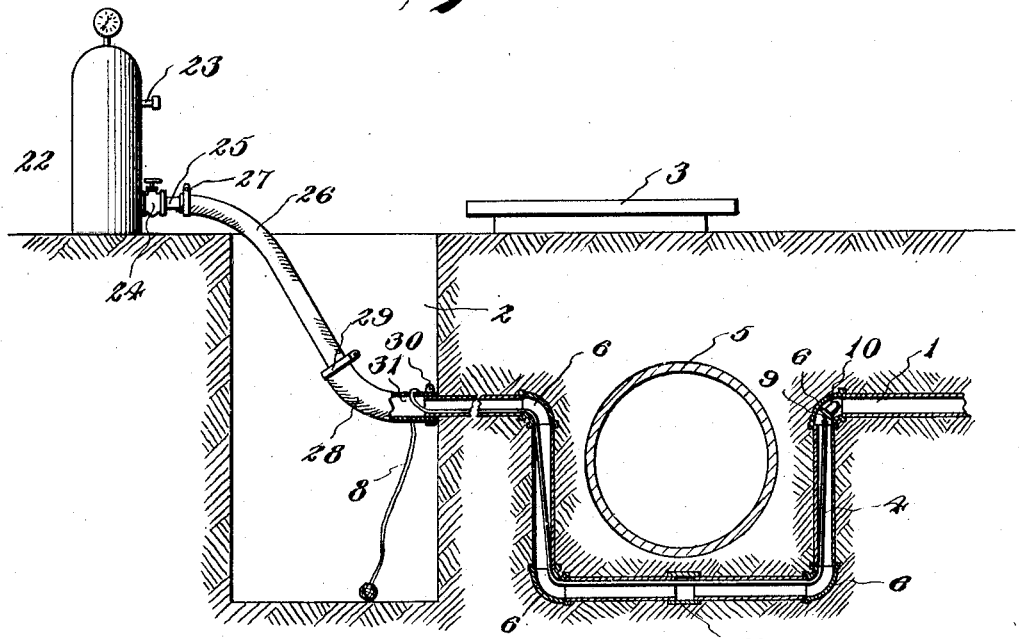
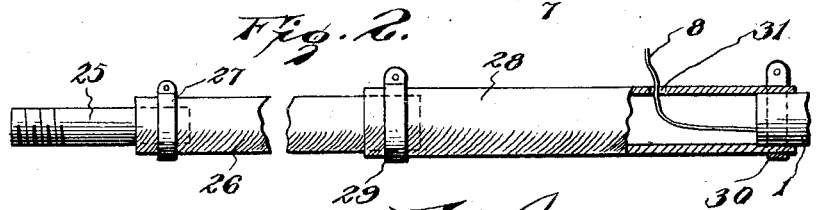
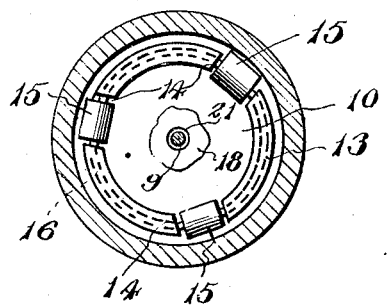
INVENTOR.
C. W. Kelley
BY
Lacey & Lacey, ATTORNEYS Patented Oct. 13, 1931

1,827,239

UNITED STATES PATENT OFFICE

CHARLES W. KELLEY, OF PURCELLVILLE, VIRGINIA

PRESSURE-OPERATED DEVICE FOR LEADING WIRES THROUGH CONDUITS

Application filed July 26, 1928. Serial No. 295,533.

This invention relates to electrical apparatus and more particularly to a device for leading a wire or cable through a conduit. At the present time electric cables are passed through conduits buried in the ground and wires constituting a lighting circuit for a building are passed through pipes embedded in walls or extending between a floor and a ceiling. It sometimes happens that a wire or cable will become broken or the insulation about wires will be damaged by lightning thereby making it necessary to withdraw the cable or wire and substitute a new one in place of the one which has become broken or otherwise damaged.

It has been found to be very difficult to pass a wire through a conduit or pipe, especially if the pipe or conduit contains bends instead of extending straight throughout its length, and, therefore, one object of the invention is to provide an apparatus by means of which a cord may be threaded through a pipe or conduit even if it contains bends and by means of the cord draw a wire or cable through the same.

Attempts have been previously made to pass a cord through a pipe through the medium of a leader attached to the cord and propelled through the pipe by compressed air or other fluid under pressure but they have not been found successful as the leader would catch against elbows employed to form bends in the pipe or against the ends of pipe sections connected by a coupling, and, therefore, another object of the invention is to provide a leader which will readily pass through a pipe and includes a core-engaging stem so connected with the body of the leader that it may have pivotal movement and thereby allow the leader to easily follow bends in a pipe without becoming caught intermediate the length of the pipe.

Another object of the invention is to provide an apparatus of this character including a source of compressed air having a valve controlled outlet with which a pipe of small diameter is connected, the other end of the pipe being secured to a larger pipe adapted to be firmly secured about one end of a conduit and formed with an opening through which a cord passes and is secured to the stem of the leader so that, when the control valve is opened and air allowed to rush through the conduit, the leader will be moved through the conduit and draw the cord through the conduit after it.

Another object of the invention is to provide an apparatus of this character which may be easily transported from one place to another and employed either for street work or within a building.

The invention is illustrated in the accompanying drawings, wherein

Figure 1 is a view showing the apparatus connected with a conduit laid in a street and the cord drawn partially through the conduit by its leader;

Fig. 2 is an enlarged view of the pipes which connect the source of compressed air with the conduit;

Fig. 3 is an enlarged longitudinal sectional view through the leader, and

Fig. 4 is a transverse sectional view through the conduit with the leader shown in end elevation.

In Figure 1, there has been shown a conduit 1 which is embedded in the ground and has one end extending into a manhole 2, the upper end of which is open and normally closed by a cover 3. The conduit or pipe 1 may be straight throughout its length or it may be formed with bends, as shown at 4, so that the conduit may extend about a sewer pipe 5 or other obstruction. In order to form the bend, elbows 6 are employed to connect companion pipe sections and companion pipe sections employed to form a straight run of conduit may be connected by couplings, such as shown at 7. While I have only shown one bend in the pipe or conduit, it will be understood that other bends may be formed when necessary and that the bends may extend either vertically or horizontally or may be merely employed in order to permit the conduit to turn a corner or have a portion extend at an angle to an adjoining portion.

In order to draw a wire through the pipe or conduit 1, I employ a cord 8 which is initially rolled in a ball in order to prevent it from becoming tangled and this cord has one end secured to the stem 9 of a thimble or leader 10, the diameter of which is such that it may be easily moved through the pipe by compressed air. This thimble or leader is preferably formed of metal and includes a head 11 which is arcuate somewhat in cross section, as shown in Fig. 3, and at its margins merges into annular walls 12 which flare toward the open rear end of the thimble where they are rolled outwardly to form a bead 13. The bead may extend entirely about the open rear end of the thimble or the thimble may be formed with circumferentially spaced recesses 14 in which are located rollers 15 rotatably mounted through the medium of a wire ring 16 disposed about the thimble within the bead 13. By employing the rollers, they may contact with the walls of the pipe and thereby reduce friction and allow the thimble or leader to very easily pass through the pipe. The stem 9 is formed of strong wire and has its outer end portion bent to form an eye 17 into which one end of the cord 8 is tied. The stem extends longitudinally through the thimble and has its forward end portion embedded in solder or a similar substance 18. The extreme forward end of the stem is bent, as shown at 19, to form an anchoring arm which prevents the stem from working loose and moving rearwardly out of the solder, but it should be noted that by turning the stem a pocket 20 and an inwardly tapered opening or throat 21 will be formed so that the stem will be loosely mounted and permitted to have universal pivotal movement relative to the thimble. Therefore, as the thimble moves through the pipe, it may have tilting movement therein and, therefore, the thimble may very easily follow a bend or elbow formed in the pipe or conduit and there will be no danger of the thimble becoming caught intermediate the length of the pipe.

The source of compressed fluid which is preferably air has been illustrated as a tank 22 having an inlet 23 through which air may be pumped into the tank and an outlet valve 24 which will be tightly closed, except when the apparatus is in use. A nipple 25 is screwed into the outlet valve and when the apparatus is in use one end of a small flexible pipe 26 is fitted upon the outer end portion of the nipple or pipe 25 where it is firmly secured by a clamp 27 of a conventional construction. The pipe 26 may be of any length desired and has its other end portion fitted into a short flexible pipe 28 where it is secured by a clamp 29 and the pipe 28 in its turn is fitted about the outer end of the pipe or conduit 1 where it is secured by a clamp 30. An opening 31 is formed in the pipe 28 adjacent the end thereof secured about the conduit 1 so that the cord 8 may be passed through this opening into the pipe 28 and attached to the stem of the thimble 10 which is placed within the outer end of the conduit before the pipe 28 is secured about the same.

When it is desired to pass a wire through an outside conduit or a conduit pipe embedded in the walls of a building, the cord 8 is threaded through the opening 31 and tied to the eye 17 of the stem 9 of the thimble after which the pipe 28 is fitted about the outer end of the conduit pipe where it is tightly secured through the medium of the clamp 30. The small pipe 26 is tightly secured about the nipple 25 and the valve 24 can then be opened in order to allow air to pass from the storage tank and rush through the pipes 26 and 28 and into the conduit pipe through which it passes and in so doing carries the nipple through the conduit pipe. It should be noted that by employing the small pipe 26 the air will not lose its force while passing to the pipe 28 which is very short. In view of the fact that the stem is loosely mounted at its forward end, the thimble will be allowed to tilt relative to the stem when an elbow or bend in a pipe is encountered and, therefore, the thimble or leader will not be liable to become jammed in the conduit pipe. As soon as the thimble passes out of the conduit pipe, the valve 24 is shut and the pipe 28 released from the conduit pipe. The cord is then tied tightly to one end of the wire to be passed through the conduit pipe and this end of the wire may be bent to form an eye or the like if so desired in order to prevent danger of the cord slipping off the wire. As the cord is drawn through the conduit pipe, the wire will be drawn after it and will eventually emerge from the other end of the conduit pipe. It will be understood that if a heavy cable is to be drawn through the conduit pipe a rope or the like of sufficient strength may be first drawn through the pipe by the cord and the cable drawn through the pipe by attaching the rope to it and then pulling the rope through the conduit.

Having thus described the invention, I claim:

Apparatus of the character described comprising a leader consisting of a hollow body having a head at its forward end and walls extending rearwardly therefrom, the body being open at its rear and the walls flaring towards its rear end and rolled outwardly to form a bead about the rear end of the body, recesses being formed in said bead in spaced relation to each other circumferentially of the body, rollers in said recesses, a ring housed in the bead and passing axially through the rollers to retain them in the recesses, and a stem extending longitudinally in said body with one end connected thereto and its other end adapted to have a cord secured thereto.

In testimony whereof I affix my signature.

CHARLES W. KELLEY.